(12) United States Patent
Guo et al.

(10) Patent No.: US 12,227,696 B2
(45) Date of Patent: Feb. 18, 2025

(54) INSTANT SOLUBLE TEMPERATURE AND SALT RESISTANT POLYACRYLAMIDE AND THE PREPARATION METHOD AND APPLICATION THEREOF

(71) Applicants: Chengdu LEPS Technology Co., Ltd, Chengdu (CN); Southwest Petroleum University, Chengdu (CN)

(72) Inventors: Jianchun Guo, Chengdu (CN); Shan Ren, Chengdu (CN); Cong Lu, Chengdu (CN); Bin Liu, Chengdu (CN); Shaobin Zhang, Chengdu (CN); Huifei Mao, Chengdu (CN); Su Diao, Chengdu (CN); Xueshan Yang, Chengdu (CN); Chaojun Tang, Chengdu (CN); Junyao Ran, Chengdu (CN); Guangyao Yang, Chengdu (CN)

(73) Assignees: Chengdu LEPS Technology Co., Ltd, Chengdu (CN); Southwest Petroleum University, Chengdu (CN)

( * ) Notice: Subject to any disclaimer, the term of this patent is extended or adjusted under 35 U.S.C. 154(b) by 0 days.

(21) Appl. No.: 18/358,879

(22) Filed: Jul. 25, 2023

(65) Prior Publication Data
US 2024/0327699 A1   Oct. 3, 2024

(30) Foreign Application Priority Data
Mar. 15, 2023   (CN) .......................... 202310244059.4

(51) Int. Cl.
*C09K 8/68* (2006.01)
(52) U.S. Cl.
CPC ............ *C09K 8/68* (2013.01); *C09K 2208/28* (2013.01)

(58) Field of Classification Search
CPC ............................. C09K 8/68; C09K 2208/28
See application file for complete search history.

(56) References Cited

U.S. PATENT DOCUMENTS 3,679,000 A * 7/1972 Kaufman ............... C09K 8/588
166/275

FOREIGN PATENT DOCUMENTS

| CN | 106590614 A | 4/2017 |
|---|---|---|
| CN | 107057675 A | 8/2017 |

(Continued)

OTHER PUBLICATIONS

Compendium of Polymer Terminology and Nomenclature-IUPAC Recommendations, 2008 (Year: 2008).*

*Primary Examiner* — Aiqun Li
(74) *Attorney, Agent, or Firm* — Nitin Kaushik

(57) ABSTRACT

The present invention pertains to the field of oilfield stimulation technologies for oil and gas field development, in particular to an instant soluble temperature and salt resistant polyacrylamide and the preparation method and application thereof, and the polyacrylamide is modified by adding rigid temperature and salt resistant monomer containing benzene ring and cationic fluorinated hydrophobic monomer on the basis of acrylamide monomer and sodium acrylate monomer, and then polymerized to obtain instant soluble temperature and salt resistant polyacrylamide. The temperature and salt resistant monomer containing benzene ring can improve the thermal stability and temperature and salt resistance of polyacrylamide, while the long-chain cationic fluorinated hydrophobic monomer can enhance the hydrophobicity of polymer. The comprehensive properties of polymer is improved by appropriate intermolecular association.

10 Claims, 5 Drawing Sheets

(56) References Cited

FOREIGN PATENT DOCUMENTS

| | | |
|---|---|---|
| CN | 109265605 A | 1/2019 |
| CN | 111087536 A | 5/2020 |
| CN | 111410949 A | 7/2020 |
| CN | 114835848 A | 8/2022 |
| JP | 2011067808 A | 4/2011 |

* cited by examiner

INSTANT SOLUBLE TEMPERATURE AND SALT RESISTANT POLYACRYLAMIDE AND THE PREPARATION METHOD AND APPLICATION THEREOF

CROSS-REFERENCE TO RELATED APPLICATIONS

The application claims priority to Chinese patent application No. 2023102440594, filed on Mar. 15, 2023, the entire contents of which are incorporated herein by reference.

TECHNICAL FIELD

The present invention pertains to the field of oilfield stimulation technologies for oil and gas field development, in particular to an instant soluble temperature and salt resistant polyacrylamide and the preparation method and application thereof.

BACKGROUND

Unconventional reservoirs, such as tight sandstone gas, coalbed methane, shale gas and tight oil, are generally characterized by strong diagenetic compaction, low maturity, small porosity and low permeability, which exert more difficulties to their exploitation. Therefore, there are a plurality of reservoir stimulation technologies developed such as fracturing, acidizing or acid-fracturing in order to achieve effective development of such reservoirs.

Fracturing fluid is among the most important chemical working fluid for fracturing stimulation technology, and its properties directly determine the final fracturing effect. As a key component of the fracturing fluid, the thickener affects and determines the temperature and salt resistance, proppant-carrying and drag reduction performance, gum breaking and flowback capability of fracturing fluid to a large extent. At present, the commonly used fracturing fluid thickeners include vegetable gelatins (guar gum, amophophallus gum, starch, cellulose, etc.) and synthetic polymers. The vegetable gelatins are advantaged in temperature resistance, easy cross- linking, high viscosity after cross-linking, and proppant-carrying capacity, but they also has some shortcomings such as poor water solubility, incomplete gum breaking, great damage to the reservoir, easy putrefaction and inferior resistance to bacterial degradation. The synthetic polymers are superior in thickening capacity, drag reduction, gum breaking performance, low residue content, and insensitivity to bacteria, and have become a new direction for the research and utilization of fracturing fluid thickener. Conventional polyacrylamide and its derivatives are more studied and used, but the temperature and salt resistance of such polymers is insufficient in practical application. At high temperature, they are more sensitive to salts (especially high-valent salts), leading to great viscosity loss, and further reducing the overall viscoelasticity and proppant-carrying capacity significantly:

It is found by retrieval that a Chinese pending patent (Publication No.: CN109265605A) proposes a low-adsorption and salt-resistant drag reducer suitable for shale reservoir fracturing stimulation, wherein the drag reducer is synthesized by acrylamide and its derivatives non-ionic monomer and Quaternary ammonium salt cationic monomer with salt resistance and low absorption through inverse emulsion polymerization, and then 0.1% of drag reducer is added to saline water with salinity of 200,000 ppm to prepare slick water, resulting in a 67.84% drag reduction rate of slick water. A Chinese pending patent (Publication No.: CN107057675A) provides a highly salt-resistant inverse emulsified drag reducer suitable for the fracturing stimulation of shale reservoir, wherein the structural stability of the drag reducer in highly mineralized water is improved by adding cationic functional monomer, allowing it to keep a good drag reduction performance in 100,000 ppm highly mineralized water. As for preparation method, a Chinese pending patent (Publication No.: CN106590614A) proposes an instant soluble salt-resistant high-viscosity drag reducer and the preparation method thereof, wherein acrylamide is used as the main body to copolymerize with salt-resistant monomer, and a stable emulsion is generated by controlling the emulsifier and cationic polymeric flocculant-DMC copolymer during polymerization. The drag reducer can realize rapid hydration and demulsification, improving the dissolution rate. The control of initiator and reaction process brings finished product with high molecular weight, good viscosification effect and high drag reduction rate. A Chinese pending patent (Publication No.: CN111410949A) proposes an integrated tackifying salt-resistant drag reducer and the preparation method thereof, wherein powder suspension technology is used to make the powder reducer and in-situ cross-linking agent coexist stably, and the viscosity is multiplied after cross-linking the cross-linking agent and thickener: a salt resistant powder thickener is used to interact with the crosslinker to further enhance salt resistance and tackification, realizing a more sensitive viscosity adjustment in a wider range, thus forming a new integrated tackifying salt-resistant drag reducer, which can realize integrated operation, solving the technical problem that the thickeners in the prior art cannot have on-line mixing, high drag reduction, high salt resistance, high proppant-carrying capacity, and strong tackification effect at the same time.

The above patents only address the salt resistance performance of the drag reducer as slick water in saline water with a salinity of no more than 100,000 ppm, but neither the content of divalent ions nor the resistance to temperature, salt and shear of the drag reducer as a linear adhesive or high-viscosity viscose are mentioned.

SUMMARY

In response to the above problems, in the first aspect, the invention proposes a method for preparing an instant soluble temperature and salt resistant polyacrylamide, comprising the following steps:

Modify the polyacrylamide by adding rigid temperature and salt resistant monomer containing benzene ring and cationic fluorinated hydrophobic monomer on the basis of acrylamide monomer and sodium acrylate monomer to generate a polymeric composite system;

Add a compound initiator to the polymeric composite system to initiate polymerization and obtain a polymer colloid:

Take out the polymer colloid, then cut, dry and sieve it to obtain instant soluble salt resistant polyacrylamide.

Further, the rigid temperature and salt resistant monomer containing benzene ring comprises one of pair-substituted carboxyl/sulfo rigid temperature and salt resistant monomer containing benzene ring, inter-substituted carboxyl/sulfo rigid temperature and salt resistant monomer containing benzene ring, and ortho-substituted carboxyl/sulfo rigid temperature and salt resistant monomer containing benzene ring.

Further, modify the polyacrylamide by adding rigid temperature and salt resistant monomer containing benzene ring and cationic fluorinated hydrophobic monomer on the basis of acrylamide monomer and sodium acrylate monomer, specifically comprising the following steps:

Feed acrylamide monomer, sodium acrylate monomer, rigid temperature and salt resistant monomer containing benzene ring, and cationic fluorinated hydrophobic monomer in a fixed proportion, and add deionized water to prepare a compound monomer aqueous solution with a total monomer mass concentration of 15-35%;

Adjust the pH value of the compound monomer aqueous solution to 5-10, add into a deoxidizer, then place the solution in a constant temperature water bath, and introduce nitrogen for 5-60 min to obtain a polymeric composite system.

Further, the molar ratio of acrylamide monomer, sodium acry late monomer, rigid temperature and salt resistant monomer containing benzene ring, and cationic fluorinated hydrophobic monomer which are fed is 1:(0.05-0.4):(0.005-0.05):(0.001-0.03);

The deoxidizer is one or more combinations of sodium gluconate, sodium ascorbate, sodium bisulfite and sodium sulfite: the concentration of the deoxidizer is 10 to 200 ppm in the compound monomer aqueous solution.

The pH regulator is one or more combinations of sodium bicarbonate, sodium hydroxide, potassium hydroxide, and glacial acetic acid.

Further, a composite initiator is added to the polymeric composite system to initiate polymerization, including the following steps:

A composite initiator is added to initiate polymerization when the temperature of the complex system reaches the initiation temperature of 30-80° C.

The polymerization reaction is completed to obtain polymer colloid when the temperature rise of the reaction system is not higher than 1° C. within 30 minutes.

Furthermore, the composite initiator is composed of organic transition metal halide and ligand containing nitrogen and phosphorus.

The organic transition metal halide is one or more combinations of cuprous chloride, ferrous chloride and cobalt chloride, and the ligand is one or more combinations of polydentate ligand, 2-bipyridyl, polyethylene polyamine, phthalic acid, succinic acid, and other ligands containing nitrogen and phosphorus.

The concentration of the added compound initiator is 100 to 1,500 ppm in the compound monomer aqueous solution, and the mass ratio of the organic transition metal halide to the ligand is 1:1.

Preferably, the compound initiator is composed of cobalt chloride and N,N,N',N'-Tetra(2-pyridylmethyl)ethylenediamine polydentate ligand.

Further, the synthesis path of the preparation method of the instant soluble temperature and salt resistant polyacrylamide is as follows:

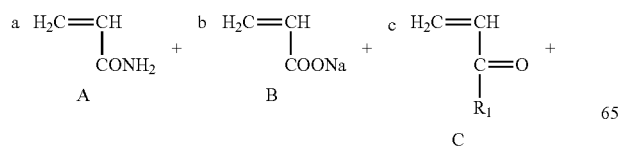

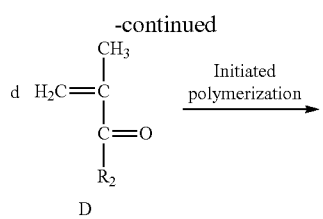

-continued

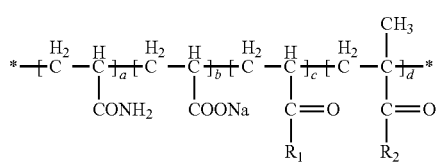

where. the molar ratio of a:b:c:d is 1:(0.05-0.4):(0.005-0.05):(0.001-0.03):

$R_1$ is any of the following three structures:

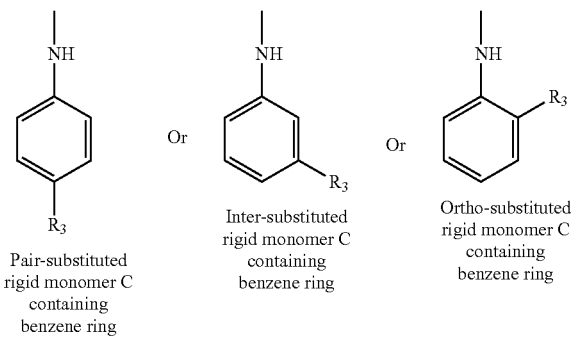

Pair-substituted rigid monomer C containing benzene ring

Inter-substituted rigid monomer C containing benzene ring

Ortho-substituted rigid monomer C containing benzene ring

Where, $R_3$ group is ——COONa, ——$SO_3Na$.

The structure of the fluorinated cationic hydrophobic monomer is as follows:

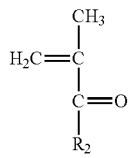

The structure of $R_2$ is as follows. m is valued 1 to 4. and n valued I to 3;

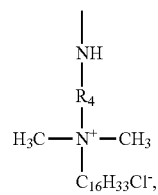

where $R_4$ group is

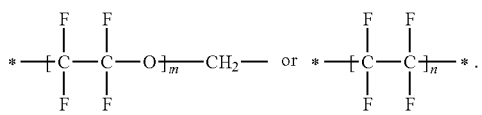

In the second aspect, the invention provides an instant soluble temperature and salt resistant polyacrylamide which is synthesized by polymerization of acrylamide monomer, sodium acrylate monomer, rigid temperature and salt resistant monomer containing benzene ring, and cationic fluorinated hydrophobic monomer, with a structural formula as follows:

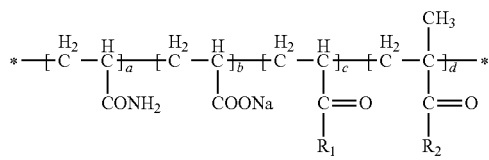

where, the molar ratio of a:b:c:d is 1:(0.05-0.4):(0.005-0.05):(0.001-0.03);

The molecular weight of the instant soluble temperature and salt resistant polyacrylamide is 5-15 million.

Further, the structural formulas of acrylamide monomer, sodium acrylate monomer, rigid temperature and salt resistant monomer containing benzene ring, and cationic fluorinated hydrophobic monomer are as follows:

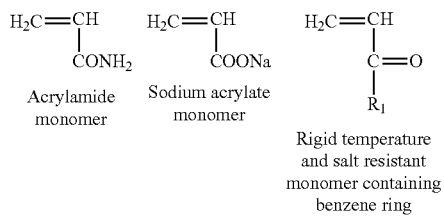

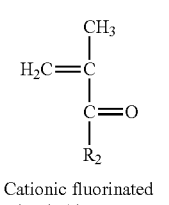

Cationic fluorinated hydrophobic monomer $R_1$ is any of the following three structures:

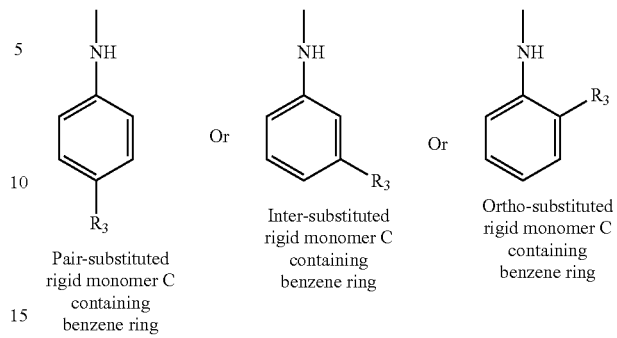

Where, $R_3$ group is ——COONa, ——SO$_3$Na.

The structure of $R_2$ is as follows, m is valued 1 to 4, and n valued 1 to 3;

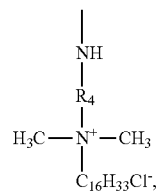

where $R_4$ group is

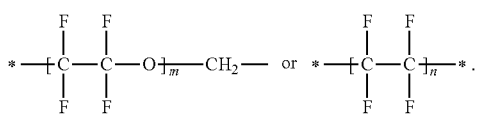

Preferably, the molar ratio of a:b:c:d is 1:(0.15-0.25):(0.015-0.03):(0.005-0.02).

Further preferably, the molar ratio of a:b:c:d is 1:(0.15-0.20):(0.015-0.02):(0.005-0.01).

In the third aspect, the invention provides the application of an instant soluble temperature and salt resistant polyacrylamide in oilfield chemistry.

Further, the application include, but is not limited to, drag reducer for fracturing fluid, thickener for drilling fluid, oil displacement agent, and profile control and blocking agent.

The present invention has the following beneficial effects:

In the invention, salt-resistant monomers containing benzene ring, sulfonic acid group and carboxyl group and fluorinated cationic hydrophobic monomer are introduced in the molecular structure to modify polyacrylamide, thereby improving the thermal stability and temperature and salt resistance of the polymer. The benzene ring group introduced increases the rigidity of the molecular main chain, which is conducive to improving the thermal stability of the polymer; the anionic charge electrostatic repulsion of the carboxyl group introduced is in favor of improving the viscosification of the product and the hydrophilicity of the polymer: the sulfonic acid group introduced is insensitive to divalent ions, making for improving the salt resistance of the polymer. The long-chain fluorinated cationic hydrophobic monomer enhances the hydrophobicity of the polymer, achieving strong intermolecular hydrophobic association with a small amount of hydrophobic monomer fed, improving the viscosification, and temperature and salt resistance by appropriate intermolecular association, and rationalizing the distribution of monomer units to enhance the technical effects of viscosification and salt resistance of temperature and salt resistant polymer.

In terms of preparation method, since the polymer molecular weight and solubility decrease after the conventional drag reducer is developed with high molecular weight or salt-resistant monomer is introduced with conventional synthesis method, the invention enables the polymer to reach the online instant dissolution required for the polymer in fracturing fluid through the design of medium and low molecular structure, low hydrophobic monomer content, the introduction of strong hydrophilic carboxyl and sulfonic acid groups, and instant dissolution and synthesis technology. In addition, the molecular weight distribution of the polymer is controlled by ATRP polymerization, and the narrower molecular weight distribution is more conducive to improving the viscosification and drag reduction rate of the polymer.

Other features and advantages of the invention will be described in subsequent Disclosure, will become apparent in the Disclosure, or will be known by the Embodiments of the invention. The purpose and other advantages of the invention may be found from the structure indicated in the Disclosure, the Claims, and the Brief Description of the Drawings.

BRIEF DESCRIPTION OF DRAWINGS

In order to explain the embodiments of the present invention or the technical solutions in the prior art more clearly, the following will make a brief introduction to the drawings needed in the description of the embodiments or the prior art. Obviously, the drawings in the following description are merely some embodiments of the present invention. For those of ordinary skill in the art, other drawings can be obtained based on the structures shown in these drawings without any creative effort.

DETAILED DESCRIPTION OF THE EMBODIMENTS

Figure 1:
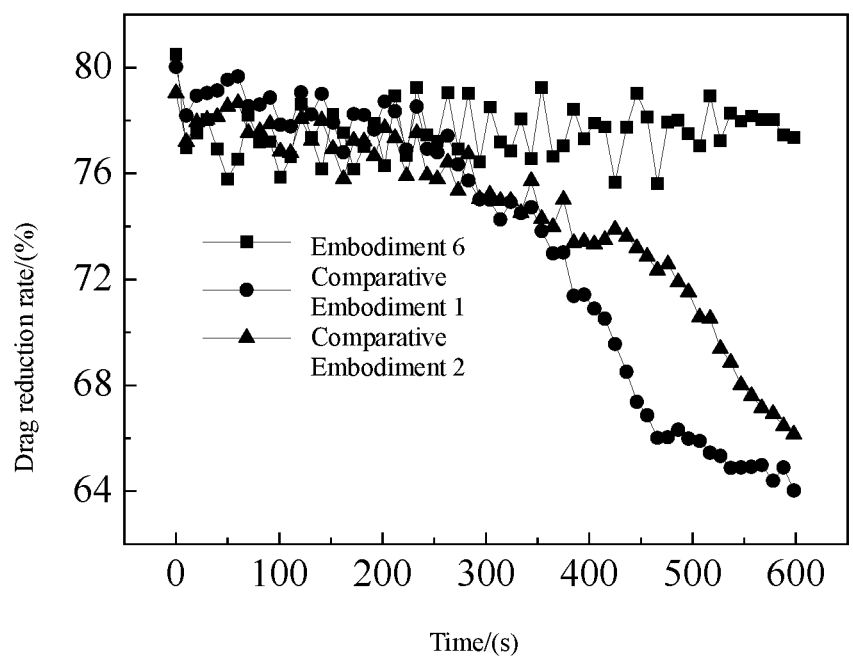
FIG. 1 is a diagram on comparison of drag reduction rate of the polymer powder prepared respectively in Embodiment 6 of the invention and Comparative Embodiments 1 and 2 in 100,000 ppm saline water.

In order to make the purpose, technical solutions and advantages of the present invention more clearly understood, the technical solutions of the embodiments of the present invention will be described expressly and integrally in conjunction with the appended figures of the embodiments of the present invention. It is clear that the described embodiments are some but not all of the embodiments of the present invention. According to the embodiments of the present invention, all other embodiments obtained by those of ordinary skill in the art without creative effort fall within the protection scope of the present invention.

In response to the inadequacies of the prior art, the invention proposes to realize polyacrylamide modification by copolymerization of four monomers (A, B, C and D), specifically modifying the polyacrylamide by adding rigid temperature and salt resistant monomer containing benzene ring (C) and cationic fluorinated hydrophobic monomer (D) on the basis of conventional polyacrylamide monomer (A) and sodium acrylate monomer (B), so as to improve the thermal stability, temperature and salt-resistant properties of the polymer. The rigid temperature and salt resistant monomer containing benzene ring contains benzene ring groups, which is beneficial for thermal stability improvement. To improve the solubility of the product, carboxyl or sulfonic acid groups are also introduced into the structure of the rigid temperature and salt resistant monomer containing benzene ring (C). The anionic charge electrostatic repulsion is in favor of improving the viscosification of the product, while sulfonic acid groups are beneficial for improving the polymer's resistance to divalent ions. The long-chain fluorinated cationic hydrophobic monomer is introduced into the molecular structure to enhance the hydrophobicity of the polymer, achieving strong intermolecular hydrophobic association with a small amount of hydrophobic monomer fed, and rationalizing the distribution of monomer units to enhance the technical effects of viscosification and salt resistance of salt resistant polymer, enabling the polymer to reach the online instant dissolution required fracturing fluid.

The structures of monomers A, B, C and D are as follows:

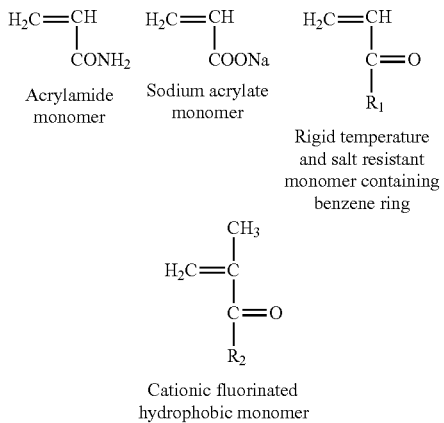

$R_1$ can be any of the following three structures:

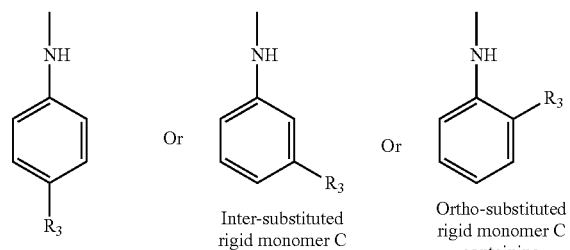

Pair-substituted rigid monomer C containing benzene ring

Inter-substituted rigid monomer C containing benzene ring

Ortho-substituted rigid monomer C containing benzene ring

Where, $R_3$ group is ——COONa, ——$SO_3$Na.

The structure of $R_2$ is as follows, m is valued 1 to 4, and n valued 1 to 3;

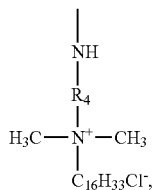

where, $R_4$ group is

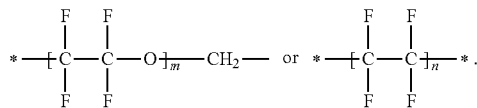

Polyacrylamide is generally prepared by aqueous solution radical polymerization. The slow initiation, fast growth and fast termination of radical polymerization determine that the polymerization product is wide in relative molecular weight distribution, uncontrollable in relative molecular weight and structure, and sometimes even branched and cross-linked, which seriously affects the properties of the polymer. Therefore, the key to achieve living radical polymerization is to prevent the generation of inactive (dead) polymer chains due to chain transfer and chain termination in the polymerization process. It has been found in studies that the rapid reversible conversion of active species (with chain growth activity) and dormant species (temporarily without chain growth activity) through reversible chain transfer or chain termination can control the concentration of free radicals in the polymerization system to be a very low level, and then inhibit the bi-radical termination, so that the free radical polymerization has the characteristics of active polymerization, known as "controlled radical polymerization".

Learned from the problems encountered in the conventional free polymerization reaction and the monomer structure adopted in the invention, ATRP polymerization method is employed in the invention to synthesize an instant solute salt resistant polyacrylamide, generating polymers with narrower molecular weight distribution and better regularity, and enabling the polymers with low and medium molecular weight to have high viscosification and salt resistance in practice. The radical concentration in the polymerization system is controlled to be a low level by the reversible transfer equilibrium reaction between radical active species and organic macromolecular halide dormant species. When the persistent radical and the transient radical are generated at the same rate in the system, the preferred product of bi-radical termination is always the cross product formed by the crossover of two different radicals. Transition metal ions and their halogen compounds are persistent, and chain radicals, as transient radicals, preferentially transfer halogen atoms by interacting with transition metal compounds under the persistent effect, instead of undergoing bi-radical termination reaction, and always accompanied by a reversible transfer equilibrium reaction between radical active species and organic macromolecular halide dormant species. Fundamentally, atom transfer radical polymerization is actually a reversible catalytic process, and the reversible conversion of the catalysts Mtn and Mtn+1–X controls the concentration of free radicals in the polymerization system to maintain it at a very low level, thus controlling the molecular weight distribution of the polymer in a narrow range.

The synthesis path of the instant soluble temperature and salt resistant polyacrylamide of the invention is as follows:

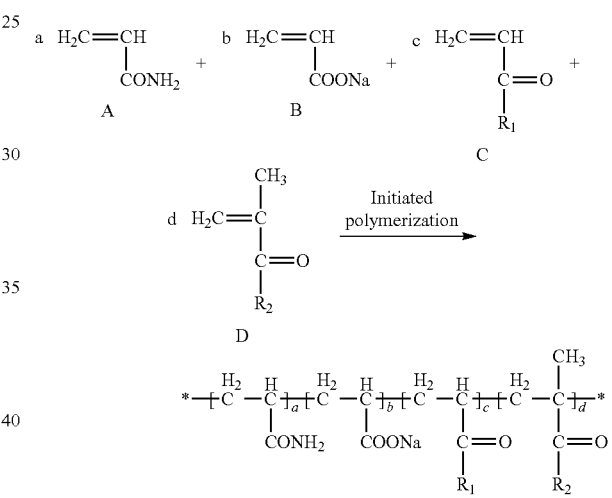

The molecular weight of the instant soluble temperature and salt resistant polyacrylamide is 5-15 million;

The molar ratio of a:b:c:d is 1:(0.05-0.4):(0.005-0.05):(0.001-0.03);

Preferably, the molar ratio of a:b:c:d is 1:(0.15-0.25):(0.015-0.03):(0.005-0.02);

Further preferably, the molar ratio of a:b:c:d is 1:(0.15-0.20):(0.015-0.02):(0.005-0.01).

The compound initiator is one or more combinations of organic transition metal halide and ligands containing nitrogen and phosphorus, wherein the organic transition metal halide is one or more combinations of cuprous chloride, ferrous chloride and cobalt chloride; the ligands include N,N,N',N'-Tetra(2-pyridylmethyl)ethylenediamine polydentate ligand, and 2-bipyridyl, polyethylene polyamine, phthalic acid, succinic acid, and other ligands containing nitrogen and phosphorus; the mass ratio of the organic transition metal halide to the ligand is 1:1; the concentration of the added compound initiator is 100 to 1,500 ppm in the compound monomer aqueous solution.

The compound initiator is composed of cobalt chloride and N,N,N',N'-Tetra(2-pyridylmethyl)ethylenediamine polydentate ligand;

The TPEN structure formula is as follows:

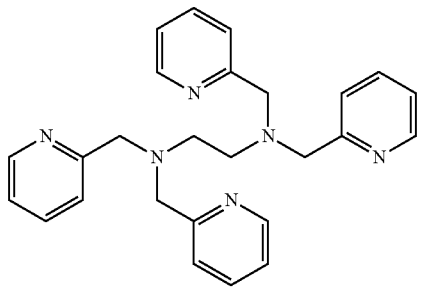 [SMILES: c1ccc(CN(CCN(Cc2ccccn2)Cc2ccccn2)Cc2ccccn2)nc1]

A small amount of deoxidizer is also introduced into the synthetic system, which includes any one or more combinations of sodium gluconate, sodium ascorbate, sodium bisulfite and sodium sulfite. The deoxidizer, with a concentration of 10 to 200 ppm in the compound monomer aqueous solution, can consume oxygen in the system and play the role of deoxidization. Its weak reducibility only allows it to react with the highly oxidized transition metal salt, but not react with the organic halide and monomer in the system. The reaction between organic halide and highly oxidized transition metal salt is not affected in the in-situ production of lowly oxidized transition metal salt.

The initiation temperature ranges from 30 to 80° C., preferably 40 to 70° C., more preferably 45-60° C., and optimally 50 to 55° C.:

The total mass concentration of compound monomer aqueous solution is 15-35%, more preferably 20-30%, and optimally 25-30%:

The time taken for nitrogen introduction and oxygen removal is 5 min to 1 h, preferably 15 to 50 min, and optimally 25 to 40 min.

The following is an elaboration on the instant soluble temperature and salt resistant polyacrylamide and the preparation method thereof and progressive effect proposed in the invention in combination with embodiments.

Embodiment 1

Feed acrylamide (A), sodium acrylate (B), sodium N-p-benzenesulfonate-acrylamide (C) and fluorinated cationic hydrophobic monomer (D) (n=1, oxygen-free) at the molar ratio of 1:0.05:0.005:0.001 into a 5,000 mL beaker then add deionized water to prepare a compound monomer aqueous solution with a total monomer mass concentration of 30%, and stir it until dissolved: next, adjust the pH value of the system to 7.5 with sodium bicarbonate solution and glacial acetic acid, add 100 ppm sodium gluconate, stir the system evenly, place it in a constant temperature water bath, and introduce nitrogen for 30 min; when the temperature is 50° C., and add a compound initiator (with a concentration of 400 ppm) consisting of cobalt chloride and TPEN to initiate polymerization: when the temperature of the reaction system rises no more than 1° C. within 30 min, the polymerization is considered to be basically completed. After the completion of the polymerization reaction for 1 hour, take out the colloid, cut it into 3-5 mm particles, spread out the colloid on a 500-mesh screen, put the screen into an oven to dry the particles at 95° C. for 2 hours, take the screen out and sieve them to obtain ≥100 meshes of instant soluble temperature and salt resistant polymer powder.

Test and calculate the viscosity-average molecular weight of instant soluble temperature and salt resistant polymer powder obtained in Embodiment 1 with an Ubbelohde viscometer (0.55 mm tube diameter) according to GB/T 12005.10-92, with a calculation result of 15 million.

Embodiment 2

According to the method in Embodiment 1, change the ratio of acrylamide (A), sodium acrylate (B), sodium N-p-benzenesulfonate-acrylamide (C) and fluorinated cationic hydrophobic monomer (D) (n=1, oxygen-free) to 1:0.05:02:0.001; test and calculate the viscosity-average molecular weight of instant soluble temperature and salt resistant polymer powder obtained in Embodiment 2 with an Ubbelohde viscometer (0.55 mm tube diameter) according to GB/T 12005.10-92, with a calculation result of 12.25 million.

Embodiment 3

According to the method in Embodiment 1, change the ratio of acrylamide (A), sodium acrylate (B), sodium N-p-benzenesulfonate-acrylamide (C) and fluorinated cationic hydrophobic monomer (D) (n=1, oxygen-free) to 1:0.05:0.05:0.001; test and calculate the viscosity-average molecular weight of instant soluble temperature and salt resistant polymer powder obtained in Embodiment 3 with an Ubbelohde viscometer (0.55 mm tube diameter) according to GB/T 12005.10-92, with a calculation result of 10.52 million.

Embodiment 4

According to the method in Embodiment 1, change the ratio of acrylamide (A), sodium acrylate (B), sodium N-p-benzenesulfonate-acrylamide (C) and fluorinated cationic hydrophobic monomer (D) (n=1, oxygen-free) to 1:0.05:0.02:0.01; test and calculate the viscosity-average molecular weight of instant soluble temperature and salt resistant polymer powder obtained in Embodiment 4 with an Ubbelohde viscometer (0.55 mm tube diameter) according to GB/T 12005.10-92, with a calculation result of 9.54 million.

Embodiment 5

According to the method in Embodiment 1, change the ratio of acrylamide (A), sodium acrylate (B), sodium N-p-benzenesulfonate-acrylamide (C) and fluorinated cationic hydrophobic monomer (D) (n=1, oxygen-free) to 1:0.05:0.02:0.03: test and calculate the viscosity-average molecular weight of instant soluble temperature and salt resistant polymer powder obtained in Embodiment 5 with an Ubbelohde viscometer (0.55 mm tube diameter) according to GB/T 12005.10-92, with a calculation result of 8.11 million.

Embodiment 6

According to the method in Embodiment 1, change the ratio of acrylamide (A), sodium acrylate (B), sodium N-p-benzenesulfonate-acrylamide (C) and fluorinated cationic hydrophobic monomer (D) (n=1, oxygen-free) to 1:0.15:0.02:0.01; change the deoxidizer sodium gluconate to into a compound deoxidizer composed of sodium gluconate, sodium ascorbate, sodium bisulfite and sodium sulfite with a mass ratio of 3:3:2:2; the dosage of the compound deoxidizer is 150 ppm: test and calculate the viscosity-average molecular weight of instant soluble temperature and salt resistant polymer powder obtained in Embodiment 6 with an Ubbelohde viscometer (0.55 mm tube diameter) according to GB/T 12005.10-92, with a calculation result of 7.98 million.

Embodiment 7

According to the method in Embodiment 1, change the ratio of acrylamide (A), sodium acrylate (B), sodium N-p-benzenesulfonate-acrylamide (C) and fluorinated cationic hydrophobic monomer (D) (n=1, oxygen-free) to 1:0.40:0.02:0.01; test and calculate the viscosity-average molecular weight of instant soluble temperature and salt resistant polymer powder obtained in Embodiment 7 with an Ubbelohde viscometer (0.55 mm tube diameter) according to GB/T 12005.10-92, with a calculation result of 7.55 million.

Embodiment 8

According to the method in Embodiment 1, change the monomer (C) to sodium N-o-benzenesulfonate-acrylamide, and change the ratio (A:B:C:D) of acrylamide (A), sodium acrylate (B), sodium N-o-benzenesulfonate-acrylamide (C) and fluorinated cationic hydrophobic monomer (D) (n=1, oxygen-free) to 1:0.15:0.02:0.01 for feeding: test and calculate the viscosity-average molecular weight of instant soluble temperature and salt resistant polymer powder obtained in Embodiment 8 with an Ubbelohde viscometer (0.55 mm tube diameter) according to GB/T 12005.10-92, with a calculation result of 8.57 million.

Embodiment 9

According to the method in Embodiment 1, change the monomer (C) to sodium sodium N-m-benzoate-acrylamide, and change the ratio (A:B:C:D) of acrylamide (A), sodium acrylate (B), sodium N-m-benzoate-acrylamide (C) and fluorinated cationic hydrophobic monomer (D) (n=1, oxygen-free) to 1:0.15:0.02:0.01 for feeding: test and calculate the viscosity-average molecular weight of instant soluble temperature and salt resistant polymer powder obtained in Embodiment 9 with an Ubbelohde viscometer (0.55 mm tube diameter) according to GB/T 12005.10-92, with a calculation result of 8.43 million.

Embodiment 10

According to the method in Embodiment 1, change the monomer (C) to sodium N-p-benzoate-acrylamide, and change the ratio (A:B:C:D) of acrylamide (A), sodium acrylate (B), sodium N-p-benzoate-acrylamide (C) and fluorinated cationic hydrophobic monomer (D) (n=1, oxygen-free) to 1:0.15:0.02:0.01 for feeding: test and calculate the viscosity-average molecular weight of instant soluble temperature and salt resistant polymer powder obtained in Embodiment 10 with an Ubbelohde viscometer (0.55 mm tube diameter) according to GB/T 12005.10-92, with a calculation result of 8.59 million.

Embodiment 11

According to the method in Embodiment 1, change the cationic fluorinated hydrophobic monomer (D) (n=1, oxygen-free) to m=4 (oxygen-containing monomer), and change the ratio of acry lamide (A), sodium acrylate (B), sodium N-p-benzenesulfonate-acry lamide (C) and fluorinated cationic hydrophobic monomer (D) (m=4, oxygen-containing monomer) to 1:0.15:0.02:0.01 for feeding: test and calculate the viscosity-average molecular weight of instant soluble temperature and salt resistant polymer powder obtained in Embodiment 11 with an Ubbelohde viscometer (0.55 mm tube diameter) according to GB/T 12005.10-92, with a calculation result of 7.21 million.

Embodiment 12

According to the method in Embodiment 1, change the cationic fluorinated hydrophobic monomer (D) (n=1, oxygen-free) to m=1 (oxygen-containing monomer), and change the ratio of acry lamide (A), sodium acrylate (B), sodium N-p-benzenesulfonate-acrylamide (C) and fluorinated cationic hydrophobic monomer (D) (m=1, oxygen-containing monomer) to 1:0.15:0.02:0.01 for feeding: test and calculate the viscosity-average molecular weight of instant soluble temperature and salt resistant polymer powder obtained in Embodiment 12 with an Ubbelohde viscometer (0.55 mm tube diameter) according to GB/T 12005.10-92, with a calculation result of 10.68 million.

Embodiment 13

According to the method in Embodiment 1, change the cationic fluorinated hydrophobic monomer (D) (n=1, oxygen-free) to n=3 (oxygen-free), and change the ratio of acrylamide (A), sodium acrylate (B), sodium N-p-benzenesulfonate-acrylamide (C) and fluorinated cationic hydrophobic monomer (D) (n=3, oxygen-free monomer) to 1:0.15:0.02:0.01 for feeding: test and calculate the viscosity-average molecular weight of instant soluble temperature and salt resistant polymer powder obtained in Embodiment 13 with an Ubbelohde viscometer (0.55 mm tube diameter) according to GB/T 12005.10-92, with a calculation result of 6.52 million.

Embodiment 14

According to the method in Embodiment 1, change the initiation temperature to 40° C., and change the ratio of acrylamide (A), sodium acrylate (B), sodium N-p-benzenesulfonate-acrylamide (C) and fluorinated cationic hydrophobic monomer (D) (n=1, oxygen-free) to 1:0.15:0.02:0.01: test and calculate the viscosity-average molecular weight of instant soluble temperature and salt resistant polymer powder obtained in Embodiment 14 with an Ubbelohde viscometer (0.55 mm tube diameter) according to GB/T 12005.10-92, with a calculation result of 9.78 million.

Embodiment 15

According to the method in Embodiment 1, change the initiation temperature to 80° C., and change the ratio of acrylamide (A), sodium acrylate (B), sodium N-p-benzenesulfonate-acrylamide (C) and fluorinated cationic hydrophobic monomer (D) (n=1, oxygen-free) to 1:0.15:0.02:0.01: test and calculate the viscosity-average molecular weight of instant soluble temperature and salt resistant polymer powder obtained in Embodiment 15 with an Ubbelohde viscometer (0.55 mm tube diameter) according to GB/T 12005.10-92, with a calculation result of 4.20 million.

Embodiment 16

According to the method in Embodiment 1, change the dosage of the compound initiator to 1,000 ppm, and change the ratio of acrylamide (A), sodium acrylate (B), sodium N-p-benzenesulfonate-acrylamide (C) and fluorinated cationic hydrophobic monomer (D) (n=1, oxygen-free) to 1:0.15:0.02:0.01; test and calculate the viscosity-average molecular weight of instant soluble temperature and salt resistant polymer powder obtained in Embodiment 16 with an Ubbelohde viscometer (0.55 mm tube diameter) according to GB/T 12005.10-92, with a calculation result of 4.52 million.

Embodiment 17

According to the method in Embodiment 1, change the dosage of the introduced deoxidizer sodium gluconate to 50 ppm, and change the ratio of acrylamide (A), sodium acrylate (B), sodium N-p-benzenesulfonate-acrylamide (C) and fluorinated cationic hydrophobic monomer (D) (n=1, oxygen-free) to 1:0.15:0.02:0.01; test and calculate the viscosity-average molecular weight of instant soluble temperature and salt resistant polymer powder obtained in Embodiment 17 with an Ubbelohde viscometer (0.55 mm tube diameter) according to GB/T 12005.10-92, with a calculation result of 6.54 million.

Embodiment 18

According to the method in Embodiment 1, change the dosage of the compound initiator to 200 ppm, and change the ratio of acrylamide (A), sodium acrylate (B), sodium N-p-benzenesulfonate-acrylamide (C) and fluorinated cationic hydrophobic monomer (D) (n=1, oxygen-free) to 1:0.15:0.02:0.01: test and calculate the viscosity-average molecular weight of instant soluble temperature and salt resistant polymer powder obtained in Embodiment 18 with an Ubbelohde viscometer (0.55 mm tube diameter) according to GB/T 12005.10-92, with a calculation result of 8.10 million.

Embodiment 19

According to the method in Embodiment 1, replace sodium gluconate with sodium ascorbate, and change the ratio of acrylamide (A), sodium acrylate (B), sodium N-p-benzenesulfonate-acrylamide (C) and fluorinated cationic hydrophobic monomer (D) (n=1, oxygen-free) to 1:0.15:0.02:0.01; test and calculate the viscosity-average molecular weight of instant soluble temperature and salt resistant polymer powder obtained in Embodiment 19 with an Ubbelohde viscometer (0.55 mm tube diameter) according to GB/T 12005.10-92, with a calculation result of 7.30 million.

Embodiment 20

According to the method in Embodiment 1, replace sodium gluconate with sodium bisulfite, and change the ratio of acrylamide (A), sodium acrylate (B), sodium N-p-benzenesulfonate-acrylamide (C) and fluorinated cationic hydrophobic monomer (D) (n=1, oxygen-free) to 1:0.15:0.02:0.01; test and calculate the viscosity-average molecular weight of instant soluble temperature and salt resistant polymer powder obtained in Embodiment 20 with an Ubbelohde viscometer (0.55 mm tube diameter) according to GB/T 12005.10-92, with a calculation result of 6.58 million.

Embodiment 21

According to the method in Embodiment 1, replace sodium gluconate with sodium sulfite, and change the ratio of acrylamide (A), sodium acrylate (B), sodium N-p-benzenesulfonate-acrylamide (C) and fluorinated cationic hydrophobic monomer (D) (n=1, oxygen-free) to 1:0.15:0.02:0.01; test and calculate the viscosity-average molecular weight of instant soluble temperature and salt resistant polymer powder obtained in Embodiment 21 with an Ubbelohde viscometer (0.55 mm tube diameter) according to GB/T 12005.10-92, with a calculation result of 6.98 million.

Embodiment 22

According to the method in Embodiment 1, replace cobalt chloride with ferrous chloride as initiator, and change the ratio of acrylamide (A), sodium acrylate (B), sodium N-p-benzenesulfonate-acrylamide (C) and fluorinated cationic hydrophobic monomer (D) (n=1, oxygen-free) to 1:0.15:0.02:0.01; test and calculate the viscosity-average molecular weight of instant soluble temperature and salt resistant polymer powder obtained in Embodiment 22 with an Ubbelohde viscometer (0.55 mm tube diameter) according to GB/T 12005.10-92, with a calculation result of 4.52 million.

Embodiment 23

According to the method in Embodiment 1, replace cobalt chloride with cuprous chloride as initiator, and change the ratio of acrylamide (A), sodium acrylate (B), sodium N-p-benzenesulfonate-acrylamide (C) and fluorinated cationic hydrophobic monomer (D) (n=1, oxygen- free) to 1:0.15:0.02:0.01; test and calculate the viscosity-average molecular weight of instant soluble temperature and salt resistant polymer powder obtained in Embodiment 23 with an Ubbelohde viscometer (0.55 mm tube diameter) according to GB/T 12005.10-92, with a calculation result of 3.54 million.

Embodiment 24

According to the method in Embodiment 1, replace N,N,N',N'-Tetra(2-pyridylmethyl)ethylenediamine (TPEN) with dipyridyl as initiator, and change the ratio of acrylamide (A), sodium acrylate (B), sodium N-p-benzenesulfonate-acrylamide (C) and fluorinated cationic hydrophobic monomer (D) (n=1, oxygen-free) to 1:0.15:0.02:0.01; test and calculate the viscosity-average molecular weight of instant soluble temperature and salt resistant polymer powder obtained in Embodiment 24 with an Ubbelohde viscometer (0.55 mm tube diameter) according to GB/T 12005.10-92, with a calculation result of 5.62 million.

Embodiment 25

According to the method in Embodiment 1, replace N,N,N',N'-Tetra(2-pyridylmethyl)ethylenediamine (TPEN) with polyethylene polyamine as initiator, and change the ratio of acrylamide (A), sodium acrylate (B), sodium N-p-benzenesulfonate-acrylamide (C) and fluorinated cationic hydrophobic monomer (D) (n=1, oxygen-free) to 1:0.15:0.02:0.01; test and calculate the viscosity-average molecular weight of instant soluble temperature and salt resistant polymer powder obtained in Embodiment 25 with an Ubbelohde viscometer (0.55 mm tube diameter) according to GB/T 12005.10-92, with a calculation result of 6.02 million.

Embodiment 26

According to the method in Embodiment 1, replace N,N,N',N'-Tetra(2-pyridylmethyl)ethylenediamine (TPEN) with phthalic acid as initiator, and change the ratio of acrylamide (A), sodium acrylate (B), sodium N-p-benzenesulfonate-acrylamide (C) and fluorinated cationic hydrophobic monomer (D) (n=1, oxygen-free) to 1:0.15:0.02:0.01; test and calculate the viscosity-average molecular weight of instant soluble temperature and salt resistant polymer powder obtained in Embodiment 26 with an Ubbelohde viscometer (0.55 mm tube diameter) according to GB/T 12005.10-92, with a calculation result of 4.50 million.

Embodiment 27

According to the method in Embodiment 1, replace N,N, N', N'-Tetra(2-pyridylmethyl)ethylenediamine (TPEN) with succinic acid as initiator, and change the ratio of acrylamide (A), sodium acrylate (B), sodium N-p-benzenesulfonate-acrylamide (C) and fluorinated cationic hydrophobic monomer (D) (n=1, oxygen-free) to 1:0.15:0.02:0.01; test and calculate the viscosity-average molecular weight of instant soluble temperature and salt resistant polymer powder obtained in Embodiment 27 with an Ubbelohde viscometer (0.55 mm tube diameter) according to GB/T 12005.10-92, with a calculation result of 5.75 million.

Embodiment 28

According to the method in Embodiment 1, change the polymerization pH value to 10, and change the ratio of acrylamide (A), sodium acrylate (B), sodium N-p-benzenesulfonate-acrylamide (C) and fluorinated cationic hydrophobic monomer (D) (n=1, oxygen-free) to 1:0.15:0.02:0.01; test and calculate the viscosity-average molecular weight of instant soluble temperature and salt resistant polymer powder obtained in Embodiment 28 with an Ubbelohde viscometer (0.55 mm tube diameter) according to GB/T 12005.10-92, with a calculation result of 2.75 million.

Embodiment 29

According to the method in Embodiment 1, change the polymerization pH value to 5, and change the ratio of acrylamide (A), sodium acrylate (B), sodium N-p-benzenesulfonate-acrylamide (C) and fluorinated cationic hydrophobic monomer (D) (n=1, oxygen-free) to 1:0.15:0.02:0.01; test and calculate the viscosity-average molecular weight of instant soluble temperature and salt resistant polymer powder obtained in Embodiment 29 with an Ubbelohde viscometer (0.55 mm tube diameter) according to GB/T 12005.10-92, with a calculation result of 3.15 million.

Comparative Embodiment 1

Feed acrylamide (A) and sodium acrylate (B) at the molar ratio of 1:0.15 into a 5,000 mL beaker then add deionized water to prepare a mixed solution with a total monomer mass concentration of 30%, and stir it until dissolved; next, adjust the pH value of the system to 8 with sodium hydroxide solution, add 100 ppm sodium gluconate, stir the system evenly, place it in a constant temperature water bath, and introduce nitrogen for 30 min; when the temperature is 30° C., and add a compound initiator (with a concentration of 200 ppm) consisting of ammonium peroxide and sodium bisulfite to initiate polymerization; when the temperature of the reaction system rises no more than 1° C. within 30 min, the polymerization is considered to be basically completed. After the completion of the polymerization reaction for 1 hour, take out the colloid, cut it into 3-5 mm particles, spread out the colloid on a 500-mesh screen, put the screen into an oven to dry the particles at 95° C. for 1-3 hours, take the screen out and sieve them to obtain ≥100 meshes of conventional instant soluble polymer powder.

Test and calculate the viscosity-average molecular weight of instant soluble temperature and salt resistant polymer powder obtained in Comparative Embodiment 1 with an Ubbelohde viscometer (0.55 mm tube diameter) according to GB/T 12005.10-92, with a calculation result of 25 million.

Comparative Embodiment 2

Feed acrylamide (A), acrylic acid (B), sodium N-p-benzenesulfonate-acrylamide (C) and fluorinated cationic hydrophobic monomer (n=1, $R_4$) at the molar ratio of 1:0.15:0.02:0.01 into a 5,000 mL beaker then add deionized water to prepare a mixed solution with a total monomer mass concentration of 30%, and stir it until dissolved: next, adjust the pH value of the system to 8 with sodium hydroxide solution, add 100 ppm sodium gluconate, stir the system evenly, place it in a constant temperature water bath, and introduce nitrogen for 30 min; when the temperature is 30° C., and add a compound initiator (with a concentration of 200 ppm) consisting of ammonium peroxide and sodium bisulfite to initiate polymerization: when the temperature of the reaction system rises no more than 1° C. within 30 min, the polymerization is considered to be basically completed. After the completion of the polymerization reaction for 1 hour, take out the colloid, cut it into 3-5 mm particles, spread out the colloid on a 500-mesh screen, put the screen into an oven to dry the particles at 95° C. for 1-3 hours, take the screen out and sieve them to obtain ≥100 meshes of instant soluble temperature and salt resistant polymer powder prepared through a conventional oxidation-reduction initiation system polymerization method.

Test and calculate the viscosity-average molecular weight of instant soluble temperature and salt resistant polymer powder obtained in Comparative Embodiment 2 with an Ubbelohde viscometer (0.55 mm tube diameter) according to GB/T 12005.10-92, with a calculation result of 15 million.

Test Embodiment

The properties of the instant soluble polymer powder prepared in Embodiments 1-29 and in Comparative Embodiments 1-2 are tested, including tackifying time, viscosity and drag reduction rate. The specific test methods are as follows:

Tackifying time

Add 200 mL of clean water into a 500 ml beaker, stir manually, add 0.06 g of the instant soluble polymer powder prepared respectively in the embodiment and comparative embodiment, record the tackifying time after adding the instant soluble polymer powder (when the solution is obviously tackified during stirring, and filamentary when drawn with a glass rod).

Viscosity

Stir at 600 r/min in different water, add an equal amount of instant soluble polymer powder prepared respectively in the embodiment and comparative embodiment, test the viscosity when adding the instant soluble polymer powder and stirring for 2 min, test the kinematic viscosity (mm2/s) of the product with a capillary viscometer when the powder content is 0.03%, and test the viscosity (mPa·s) at $170s^{-1}$ with a six-speed viscometer when the powder content is 0.1%-0.2%. The content of divalent ions is 20,000 ppm in the 100,000 ppm simulated water.

The test results of the tackifying time and viscosity of each embodiment and comparative embodiment are shown in Table 1.

TABLE 1

Comparison of Viscosity Values of Base Fluid in Different Water between Embodiment and Comparative Embodiment

| Embodiment | Tackifying time/s | 0.03% powder viscosity/ (mm²/s) | | | 0.1% powder viscosity/ (mPa · s) | | | 0.2% powder viscosity/ (mPa · s) | | |
|---|---|---|---|---|---|---|---|---|---|---|
| | | Clean water | 3% KCl | 100,000 ppm | Clean water | 3% KCl | 100,000 ppm | Clean water | 3% KCl | 100,000 ppm |
| 1 | 20 | 4.52 | 3.58 | 2.02 | 12.5 | 7.7 | 6.85 | 29.8 | 21.3 | 14.98 |
| 2 | 15 | 5.12 | 3.97 | 2.83 | 14.9 | 11.2 | 7.58 | 32.8 | 27.8 | 17.78 |
| 3 | 25 | 4.87 | 3.68 | 2.09 | 14 | 8.7 | 7.15 | 29.8 | 24.5 | 15.98 |
| 4 | 20 | 6.89 | 6.06 | 4.23 | 17.9 | 14.5 | 10.94 | 38.5 | 33.86 | 22.8 |
| 5 | 48 | 4.97 | 3.68 | 2.26 | 14.2 | 10.9 | 6.93 | 28.8 | 24.2 | 15.21 |
| 6 | 15 | 7.58 | 6.45 | 4.58 | 19.5 | 16.2 | 11.26 | 40.7 | 39.8 | 25.75 |
| 7 | 15 | 5.35 | 4.12 | 3.16 | 15.8 | 11.78 | 8.24 | 32.6 | 27.8 | 18.25 |
| 8 | 20 | 6.05 | 5.85 | 3.35 | 15.2 | 12.9 | 8.16 | 32.8 | 28.3 | 18.98 |
| 9 | 15 | 6.5 | 5.98 | 3.76 | 17.8 | 15.52 | 10.87 | 35.8 | 29.5 | 22.54 |
| 10 | 10 | 6.85 | 5.12 | 4.08 | 18.9 | 16.2 | 11.34 | 32.7 | 28.5 | 21.96 |
| 11 | 30 | 7.8 | 6.95 | 5.05 | 20.8 | 18.9 | 13.57 | 43.4 | 40.8 | 27.75 |
| 12 | 15 | 6.02 | 5.08 | 3.15 | 13.8 | 11.5 | 6.16 | 31.4 | 25.2 | 17.95 |
| 13 | 20 | 6.88 | 5.98 | 4.12 | 15.2 | 13.5 | 9.98 | 35.4 | 30.4 | 19.94 |
| 14 | 20 | 7.8 | 6.5 | 4.1 | 18.6 | 14.8 | 10.23 | 37.7 | 32.3 | 22.78 |
| 15 | 10 | 4.3 | 3.54 | 2.03 | 11.8 | 7.5 | 4.02 | 26.9 | 19.9 | 10.58 |
| 16 | 15 | 4.32 | 3.89 | 2.58 | 11.5 | 8.95 | 4.98 | 28.9 | 20.2 | 10.02 |
| 17 | 15 | 5.12 | 4.01 | 2.58 | 14.4 | 9.95 | 4.81 | 30.5 | 16.8 | 8.2 |
| 18 | 30 | 6.54 | 5.85 | 4.03 | 16.8 | 12.89 | 9.35 | 36.6 | 31.6 | 20.5 |
| 19 | 12 | 7.21 | 6.12 | 4.31 | 18.9 | 15.8 | 10.28 | 38.5 | 37.5 | 22.5 |
| 20 | 15 | 6.98 | 6.13 | 4.10 | 17.8 | 14.3 | 9.85 | 35.4 | 32.8 | 19.80 |
| 21 | 15 | 7.02 | 6.15 | 4.15 | 17.8 | 14.9 | 9.89 | 37.9 | 35.9 | 21.6 |
| 22 | 10 | 4.35 | 2.64 | 1.98 | 13.4 | 10.8 | 7.96 | 28.2 | 19.6 | 12.3 |
| 23 | 10 | 5.23 | 3.21 | 2.45 | 15.6 | 12.4 | 9.85 | 31.5 | 21.9 | 14.5 |
| 24 | 12 | 6.21 | 5.75 | 4.12 | 17.9 | 15.2 | 10.52 | 36.5 | 32.8 | 22.45 |
| 25 | 15 | 6.18 | 5.65 | 3.58 | 15.8 | 13.2 | 9.2 | 33.3 | 27.5 | 19.8 |
| 26 | 16 | 4.23 | 3.56 | 2.12 | 10.9 | 7.84 | 4.21 | 24.5 | 18.3 | 8.90 |
| 27 | 15 | 5.98 | 3.54 | 2.58 | 15.9 | 13.4 | 10.9 | 32.0 | 22.8 | 15.2 |
| 28 | 5 | 2.58 | 1.74 | 1.22 | 12.4 | 5.8 | 2.12 | 18.2 | 10.2 | 3.54 |
| 29 | 7 | 3.45 | 1.98 | 1.68 | 14.5 | 7.2 | 3.04 | 22.5 | 11.5 | 4.05 |
| Comparative Embodiment 1 | 35 | 4.02 | 2.05 | 1.55 | 13.5 | 7.8 | 3.89 | 27.8 | 13.7 | 5.08 |
| Comparative Embodiment 2 | 40 | 5.18 | 2.85 | 1.87 | 15.2 | 8.1 | 5.68 | 32.7 | 18.9 | 10.59 |

(3) Drag Reduction Rate

Test and determine the drag reduction rates of the instant soluble polymer powders prepared in the embodiment and comparative embodiment in different water in accordance with the provisions of Chapter 7.13.1.1 of SY/T 6376-2008, and take the drag reduction rate data at 5 min as the drag reduction rate value. The test results are shown in Table 2.

TABLE 2

Comparison of Drag Reduction Rates in Different Water between Embodiment and Comparative Embodiment (10 min)

| | Drag reduction rate of 0.03% powder/(%) | | |
|---|---|---|---|
| Embodiment | Clean water | 3% KCl | 100,000 ppm |
| 1 | 80.6 | 76.8 | 73.5 |
| 2 | 78.5 | 74.8 | 71.8 |
| 3 | 77.5 | 74.5 | 71 |
| 4 | 81.2 | 78.4 | 74.8 |
| 5 | 72.8 | 68.8 | 66.8 |
| 6 | 83.9 | 79.7 | 77.5 |
| 7 | 75.5 | 74 | 72.3 |
| 8 | 81.4 | 78.5 | 74.7 |
| 9 | 82.8 | 76.9 | 75.6 |
| 10 | 82.2 | 75.3 | 74.2 |
| 11 | 81.2 | 79.5 | 74.3 |
| 12 | 73.9 | 70.7 | 68.5 |
| 13 | 76.2 | 72.8 | 68.9 |
| 14 | 83.9 | 79.4 | 75.5 |
| 15 | 71.5 | 67.5 | 65.4 |
| 16 | 76.9 | 75.5 | 72.2 |
| 17 | 79.8 | 76.8 | 74.5 |
| 18 | 78.8 | 74.3 | 72.9 |
| 19 | 79.8 | 75.1 | 71.2 |
| 20 | 74.3 | 70.2 | 67.4 |
| 21 | 75.6 | 71.2 | 69.8 |
| 22 | 71.0 | 68.2 | 62.1 |
| 23 | 70.2 | 65.3 | 62.3 |

TABLE 2-continued

Comparison of Drag Reduction Rates in Different Water between Embodiment and Comparative Embodiment (10 min)

| Embodiment | Drag reduction rate of 0.03% powder/(%) | | |
|---|---|---|---|
| | Clean water | 3% KCl | 100,000 ppm |
| 24 | 72.2 | 69.8 | 64.2 |
| 25 | 74.5 | 70.8 | 66.8 |
| 26 | 71.3 | 67.5 | 63.5 |
| 27 | 72.5 | 68.2 | 63.8 |
| 28 | 65.4 | 60.4 | 55.6 |
| 29 | 63.5 | 59.8 | 54.3 |
| Comparative Embodiment 1 | 75.0 | 71.2 | 64.9 |
| Comparative Embodiment 2 | 74.5 | 72.5 | 66.2 |

FIG. 1 shows the comparison of the drag reduction rates of the instant soluble polymers prepared in Embodiment 6 of the invention and Comparative Embodiments 1 and 2 in 100,000 ppm saline water. It can be learned that the drag reduction rate of the instant soluble temperature and salt resistant polymer powder prepared in Embodiment 6 after 250 min is significantly higher than that of the conventional polymer powder with high molecular weight and instant soluble salt resistant polymer powder prepared in Comparative Embodiments 1 and 2.

Figure 2:
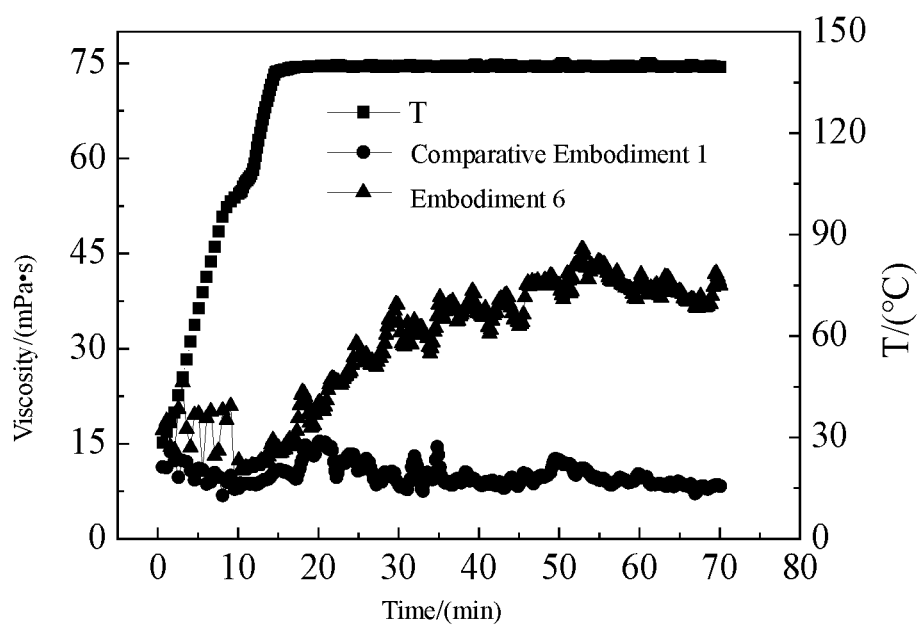
FIG. 2 is a diagram on comparison of temperature and shear resistance of the linear colloidal system of the polymer powder prepared respectively in Embodiment 6 of the invention and Comparative Embodiment 1.

FIG. 2 presents the comparison of the temperature and shear resistance of the linear colloidal system of Embodiment 6 and Comparative Embodiment 1 (3% KCl water and 0.2% polymer, referring to the temperature and shear resistance test in SY/T 7627-2021), where T stands for the temperature rise curve. As can be seen from FIG. 2, the temperature and shear resistance of the instant soluble polymer powder prepared in Embodiment 6 is significantly higher than that of the conventional polymer powder with ultra-high molecular weight prepared in Comparative Embodiment 1.

Figure 3:
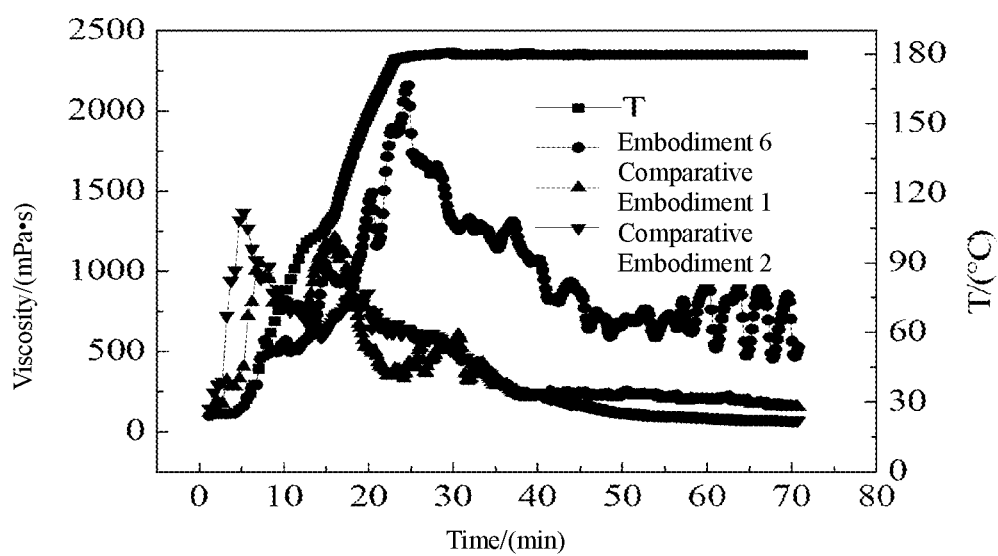
FIG. 3 is a diagram on comparison of temperature and shear resistance of the cross-linking system of the polymer powder prepared respectively in Embodiment 6 of the invention and Comparative Embodiments 1 and 2.

FIG. 3 displays the comparison of the temperature and shear resistance of the cross-linking system of Embodiment 6 and Comparative Embodiments 1 and 2 (3% KCl water and 0.4% polymer+0.3% crosslinker, referring to the temperature and shear resistance test in SY/T 7627-2021), where T stands for the temperature rise curve. As can be seen from FIG. 3, the temperature and shear resistance of the instant soluble polymer powder prepared in Embodiment 6 is significantly higher than that of the conventional instant soluble polymer powder and instant soluble salt resistant polymer powder respectively prepared in Comparative Embodiments 1 and 2.

Figure 4:
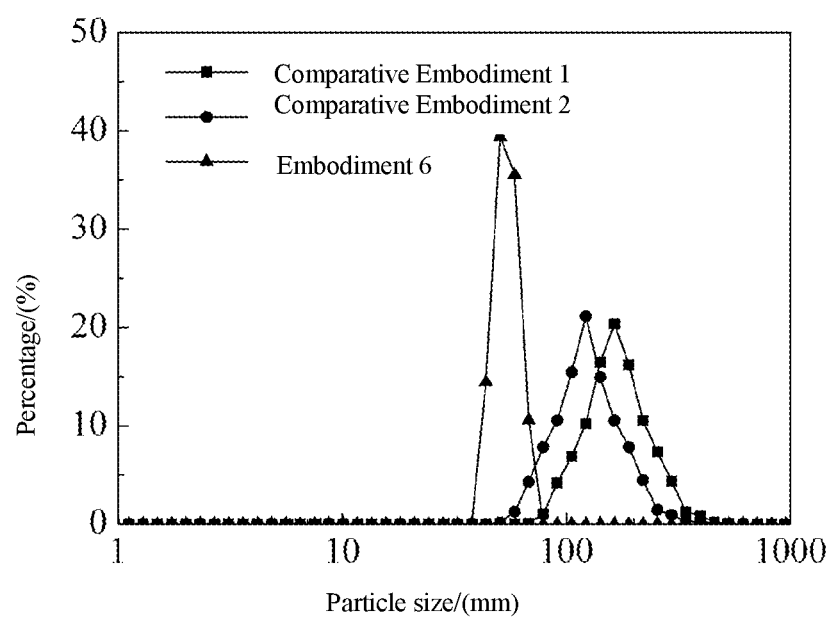
FIG. 4 is a diagram on particle size distribution under dynamic light scattering of the polymer powder prepared respectively in Embodiment 6 of the invention and Comparative Embodiments 1 and 2.

As can be seen from the particle size distribution diagram of Embodiment 6 and Comparative Embodiments 1 and 2 (FIG. 4), the particle size of the instant soluble temperature and salt resistant polymer powder prepared in Embodiment 6 is featured by narrow molecular weight distribution range and small molecular size, while the polymer prepared by conventional polymerization method has wider the molecular weight distribution range and larger molecular size.

Figure 5:
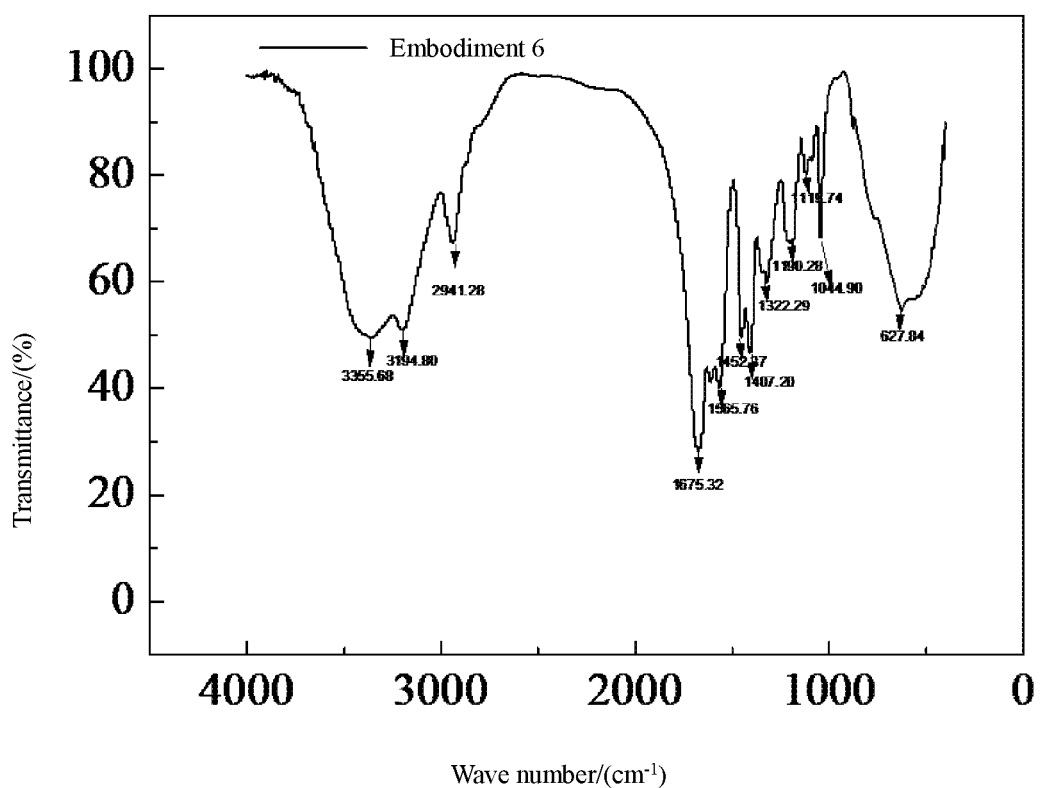
FIG. 5 is an infrared spectrum of the instant soluble temperature and salt resistant polymer powder prepared in Embodiment 6 of the invention.

The instant soluble temperature and salt resistant polymer powder prepared in Embodiment 6 is tested by infrared spectroscopy, with its Fourier infrared spectroscopy shown in FIG. 5, where there is antisymmetric stretching vibration and symmetric stretching vibration peaks of N-H bonds on —CONH$_2$ (acylamino) at wave numbers of 3,355 cm$^{-1}$ and 3,194 cm$^{-1}$, stretching and bending vibration peaks of C—H at 2,941 cm$^{-1}$ and 1,452 cm$^{-1}$, stretching vibration peak of amide I mode C=O at 1,675 cm$^{-1}$, stretching vibration peak of COO— at 1,407 cm$^{-1}$, stretching vibration peak of C—N at 1,322 cm$^{-1}$, stretching vibration peak of C—O bond at 1,190 cm$^{-1}$, stretching vibration peak of C—F bond at 1,044 cm$^{-1}$, vibration peak of C=C band aromatic ring at 1,565 cm$^{-1}$, characteristic absorption peak of sulfonic acid group at 627 cm$^{-1}$. It can be preliminarily concluded from the above data that the synthesized polymer is a temperature and salt resistant copolymer.

Despite the detailed description of the invention with reference to the preceding embodiments, it should be understood by those of ordinary skill in the art that it is still possible to modify the solutions to problem set forth in the preceding embodiments, or to make equivalent substitutions for some of the technical features thereof, and that such modifications or substitutions do not make the essence of the solution to problem depart from the spirit and scope of the solution to problem of each embodiment in the invention.

What is claimed is:

1. A method for preparing an instant soluble temperature and salt resistant polyacrylamide, comprising the following steps:

Feed acrylamide monomer, sodium acrylate monomer, a rigid temperature and salt resistant monomer containing a benzene ring, and a cationic fluorinated hydrophobic monomer in a fixed proportion, and add deionized water to prepare a compound monomer aqueous solution with a total monomer mass concentration of 15-35%; adjust the pH value of the compound monomer aqueous solution to 5-10, add into a deoxidizer, then place the solution in a constant temperature water bath, and introduce nitrogen for 5-60 min to obtain a polymeric composite system;

The structural formula of the rigid temperature and salt resistant monomer containing a benzene ring is:

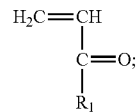

where, R$_1$ is any of the following three structures:

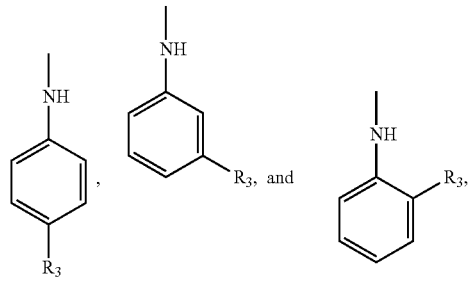

where R$_3$ is —COONa or —SO$_3$Na;

The structure of the fluorinated cationic hydrophobic monomer is as follows:

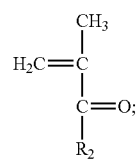

where, the structure of $R_2$ is as follows:

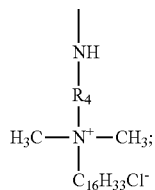

where, $R_4$ group is

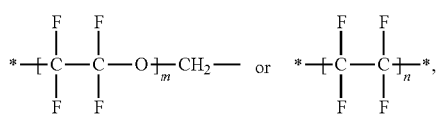

the values of m are from 1 to 4 and the values of n are from 1 to 3;

Add a composite initiator to the polymeric composite system to initiate polymerization and obtain a polymer gel; the composite initiator is composed of an organic transition metal halide and a ligand containing nitrogen and phosphorus; the organic transition metal halide is one or more of cuprous chloride, ferrous chloride and cobalt chloride, and the ligand is one or more of N,N,N',N'-Tetra (2-pyridylmethyl) ethylenediamine polydentate ligand, 2-bipyridyl, polyethylene polyamine, phthalic acid, succinic acid, and other ligands containing nitrogen and phosphorus;

Take out the polymer gel, then cut, dry and sieve it to obtain the instant soluble temperature and salt resistant polyacrylamide.

2. The method for preparing an instant soluble temperature and salt resistant polyacrylamide according to claim 1, the molar ratio of acrylamide monomer, sodium acrylate monomer, the rigid temperature and salt resistant monomer containing a benzene ring, and the cationic fluorinated hydrophobic monomer is 1:(0.05-0.4):(0.005-0.05):(0.001-0.03);

the deoxidizer is one or more of sodium gluconate, sodium ascorbate, sodium bisulfite and sodium sulfite; the concentration of the deoxidizer is 10 to 200 ppm in the compound monomer aqueous solution;

the pH regulator is one or more of sodium bicarbonate, sodium hydroxide, potassium hydroxide, and glacial acetic acid.

3. The method for preparing an instant soluble temperature and salt resistant polyacrylamide according to claim 1, wherein add the composite initiator to the polymeric site system to initiate polymerization comprises the following steps:

the composite initiator is added to initiate polymerization when the temperature of the complex system reaches the initiation temperature of 30-80° C.;

the polymerization reaction is completed to obtain polymer gel when the temperature rise of the reaction system is not higher than 1° C. within 30 minutes.

4. The method for preparing an instant soluble temperature and salt resistant polyacrylamide according to claim 1, the concentration of the added composite initiator is 100 to 1,500 ppm in the compound monomer aqueous solution, and the mass ratio of the organic transition metal halide to the ligand is 1:1.

5. The method for preparing an instant soluble temperature and salt resistant polyacrylamide according to claim 1, the composite initiator is composed of cobalt chloride and N,N,N',N'-Tetra (2-pyridylmethyl) ethylenediamine polydentate ligand.

6. The method for preparing an instant soluble temperature and salt resistant polyacrylamide according to claim 1, the synthesis path of the preparation method of the instant soluble temperature and salt resistant polyacrylamide is as follows:

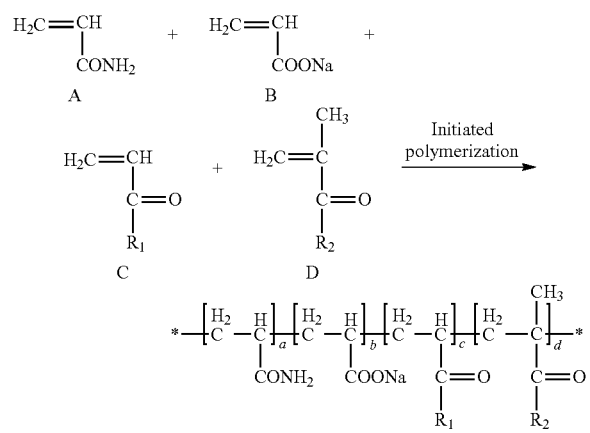

where, the molar ratio of a:b:c:d is 1:(0.05-0.4):(0.005-0.05): (0.001-0.03).

7. The method for preparing an instant soluble temperature and salt resistant polyacrylamide according to claim 1, wherein a molecular weight of the instant soluble temperature and salt resistant polyacrylamide is 3-15 million.

8. An instant soluble temperature and salt resistant polyacrylamide prepared with the method according to claim 1, with a structural formula as follows:

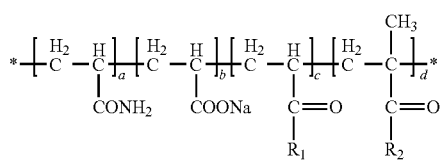

Where, the molar ratio of a:b:c:d is 1:(0.05-0.4):(0.005-0.05): (0.001-0.03).

9. The instant soluble temperature and salt resistant polyacrylamide according to claim 8, the molecular weight of the instant soluble temperature and salt resistant polyacrylamide is 3-15 million.

10. A drag reducer comprises the instant soluble temperature and salt resistant polyacrylamide is prepared according to the method of claim 1.

* * * * *